Patented Jan. 20, 1925.

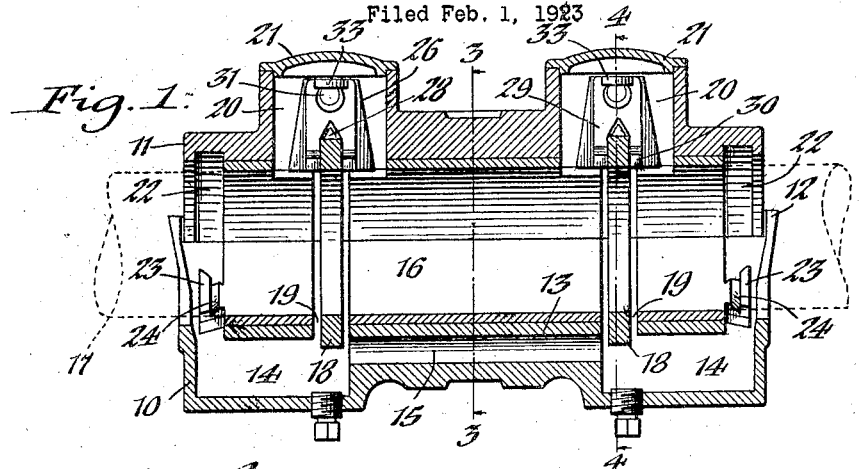
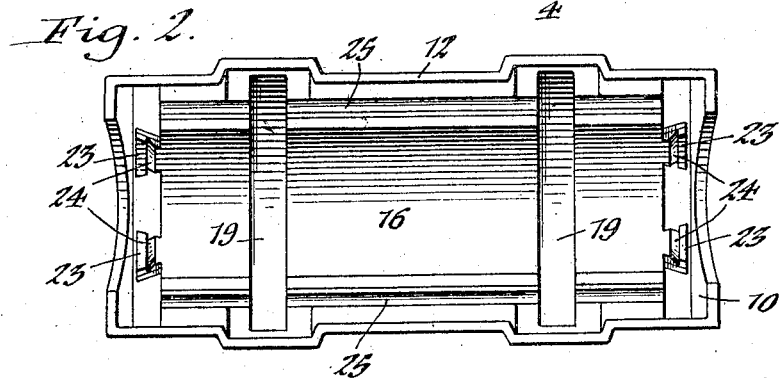
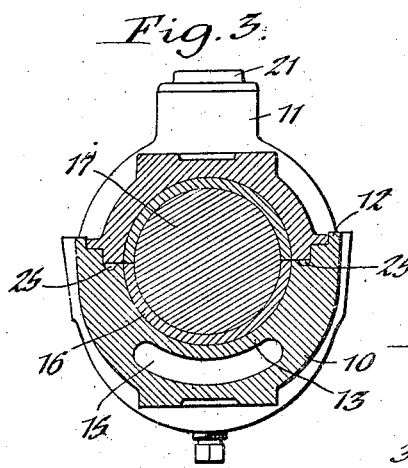
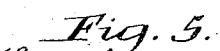
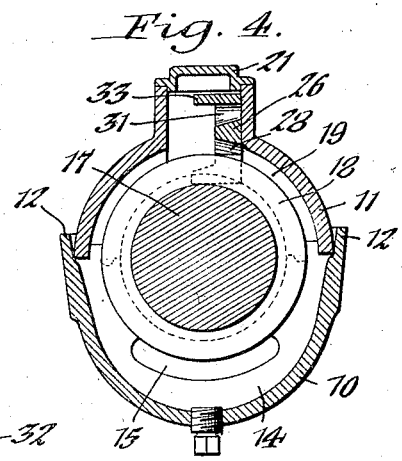

1,523,523

UNITED STATES PATENT OFFICE.

JOHN I. GUETL, OF BUFFALO, NEW YORK.

SHAFT BEARING.

Application filed February 1, 1923. Serial No. 616,380.

*To all whom it may concern:*

Be it known that I, JOHN I. GUETL, a citizen of the United States, residing in Buffalo, in the county of Erie and State of New York, have invented new and useful Improvements in Shaft Bearings, of which the following is a specification.

This invention relates to the class of self-oiling shaft bearings or journal boxes which are provided in their bottom with an oil well or reservoir into which dips a collar secured to the shaft, so as to elevate the oil to the top of the latter, an oil-deflecting saddle being mounted on the shaft and the shaft seat of the bearing being provided at its ends with channels or passages through which the surplus oil returns into the reservoir.

One of the objects of the invention is to improve the construction of the oil-deflecting saddle with a view of effecting a quiet flow of oil over the top of the shaft and preventing its splashing and escaping at the top of the bearing box.

A further object is to provide the bearing with improved means for preventing leakage of oil at its ends and through the joint between the upper and lower sections of the bearing-box.

In the accompanying drawings: Figure 1 is a central longitudinal section of the bearing, with the shaft shown in dotted lines. Figure 2 is a top plan view of the lower section of the bearing. Figures 3 and 4 are transverse sections on the correspondingly numbered lines in Fig. 1. Figure 5 is a perspective view of the saddle.

Similar characters of reference refer to like parts throughout the several views.

The bearing-box may be of any appropriate construction but preferably consists of a lower section 10 and an upper section 11, the lower section being provided with a retaining rim 12 within which the upper section fits.

Formed in the lower section is a semi-cylindrical shaft-seat 13 under the opposite ends of which are arranged oil wells or reservoirs 14 connected by a channel 15 in the central portion of said bearing section. The shaft-seat of the bearing may be provided with the usual lining 16 of babbit or similar material.

17 indicates the shaft or journal to which are secured one or more oil elevating collars 18 which extend through transverse slots 19 formed on the shaft-seat 13 and its lining and dip into the oil in the reservoir 14, in a well known manner. The upper portions of these collars extend through similar slots in the top of the lining 16 and into filling-openings 20 having removable covers 21.

Adjacent to the ends of the shaft-seat, the bearing box has annular oil grooves 22 which open into the corresponding reservoirs 14 for returning any surplus oil thereto. Projecting from each end of said shaft-seat are two or more substantially dovetailed lugs or oil-scrapers 23 which are preferably located on opposite sides of the center line of the bearing and adapted to intercept and scrape from the underside of the shaft any oil which may creep outwardly beyond the ends of the shaft-seat 13, the oil thus removed from the shaft dripping over the lateral edges of the scrapers into the reservoir. The upper or bearing faces of these scrapers are provided with transverse grooves 24 which extend from edge to edge thereof and serves to prevent the oil from leaking at the outer ends of the bearing, said grooves compelling the oil to flow into the reservoirs 14. These grooves especially serve their purpose when the oil becomes thick after being in the bearing for some time.

The lower bearing section 10 is provided on opposite sides between the rim 12 and the upper edge of the lining 16 with longitudinal oil-receiving grooves or channels 25 which extend throughout the length of the shaft-seat 13, as shown in Fig. 2. These grooves receive the surplus oil splashed upwardly from the reservoir and conduct it back into the same through the slots 19 and grooves 22. In addition to this function, these grooves do away with the usual leather packing between the upper and lower sections of the bearing-box, thus effecting an important saving in material and in the time required to pack the box.

It will be noted that the rim 12 on the lower section 10 extends a suitable distance above the joint between both box-sections, thus effectively guarding against leakage of the oil over said rim.

Arranged within the filling openings 20 and the straddling the adjacent portions of the shaft-collars 18 are the saddles or oil-deflectors 26. Each of these saddles consists of a plate somewhat narrower than the filling opening, having in its lower edge a central notch 27 which receives the companion collar and snugly fits the same to prevent leakage of oil between these parts. The upper portion of this notch preferably extends above the corresponding face of the shaft-collar, as shown in Figs. 1 and 3, to form a relief passage 28 which allows any excess oil to pass forwardly through it and return into the reservoir. In the drawings, the upper portion of said notch is tapered upwardly, the same being shown in the shape of an inverted V, but it may be of any other appropriate shape. To retard the flow of oil through the relief passage, its side walls are tapered rearwardly, as shown in Fig. 1.

The edge of the saddle-notch may be provided with the customary flange 29 which projects beyond the face of the saddle and terminates at its lower ends in feet 30, the toes or front portions of which rest upon the shaft 17. During the rotation of the latter, the saddle rests against the rear wall of the filling opening 20 and the feet 30 prevent the saddle from tilting forwardly. The relief passage 28 is located below said wall and within the main chamber of the bearing-box, as shown in Fig. 4.

Above the relief passage, the saddle has an opening or cavity 31 which preferably extends through the saddle-plate and is closed at the back by the rear wall of the filling-opening 20. This cavity is formed partly in a boss or upward extension 32 of the saddle-flange 29, and in its preferred form it is tapered rearwardly, as shown. By this construction and arrangement, some of elevated oil enters the opening 31 and gently flows out of it again, preventing it from splashing out of the top of the bearing-box.

A handle 33 may be provided at the top of the saddle for conveniently withdrawing it from the filling-opening 20, when desired.

I claim as my invention:

1. A shaft-bearing having a shaft-seat, a reservoir located beneath said seat and an oil return passage arranged at the end of said seat and leading to the reservoir, the seat being provided at its end with a projecting scraper having a transverse oil groove in its bearing face.

2. The combination with a bearing box having a filling-opening, and a shaft having an oil-elevating device, of an oil distributing saddle located in the filling-opening and consisting of a plate adapted to rest against the rear wall of said opening, the lower edge of said plate having a notch for receiving said oil elevating device, said notch terminating in a relief passage extending above said elevating device and located below the rear wall of the filling-opening.

3. The combination with a bearing box having a filling-opening and a shaft having an oil-elevating device, of an oil distributing saddle located in the filling-opening and consisting of a plate adapted to rest against the rear wall of said opening, the lower edge of said plate having a notch for receiving said oil elevating device, said notch terminating in a relief passage extending above said elevating device and located below the rear wall of the filling-opening, the portion of the saddle plate above said relief passage having a cavity closed at its back.

4. The combination with a bearing box having a filling-opening and a shaft having an oil-elevating device, of an oil distributing saddle located in the filling-opening and consisting of a plate adapted to rest against the rear wall of said opening, the lower edge of said plate having a notch for receiving said oil elevating device, said notch terminating in a relief passage extending above said elevating device and located below the rear wall of the filling-opening, the portion of the saddle plate above said relief passage having an opening closed at its back by the rear wall of said filling-opening.

5. An oil distributing saddle for bearing boxes, comprising a plate having in its lower edge a notch for receiving an oil elevating device, the upper portion of said notch extending above the oil elevating device and having upwardly converging walls.

JOHN I. GUETL.